United States Patent
Sabourin et al.

(10) Patent No.: US 7,346,228 B2
(45) Date of Patent: Mar. 18, 2008

(54) SIMULTANEOUS GENERATION OF SPATIALLY COMPOUNDED AND NON-COMPOUNDED IMAGES

(75) Inventors: Thomas J. Sabourin, Milwaukee, WI (US); Michael J. Washburn, Brookfield, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 779 days.

(21) Appl. No.: 10/658,723

(22) Filed: Sep. 9, 2003

(65) Prior Publication Data

US 2005/0053308 A1 Mar. 10, 2005

(51) Int. Cl.
*G06K 9/36* (2006.01)
*A61B 8/00* (2006.01)

(52) U.S. Cl. .................. 382/284; 382/132; 600/443

(58) Field of Classification Search ........ 382/128–134, 382/284, 305; 345/629; 600/437, 443, 457–458; 358/505
See application file for complete search history.

(56) References Cited

U.S. PATENT DOCUMENTS

| | | | | |
|---|---|---|---|---|
| 5,396,890 A | * | 3/1995 | Weng | ........................ 600/443 |
| 5,469,849 A | * | 11/1995 | Sasaki et al. | ................ 600/443 |
| 5,690,111 A | * | 11/1997 | Tsujino | ........................ 600/440 |
| 5,782,766 A | * | 7/1998 | Weng et al. | ................. 600/443 |
| 6,423,004 B1 | * | 7/2002 | Dong et al. | .................. 600/443 |
| 6,464,638 B1 | * | 10/2002 | Adams et al. | ............... 600/443 |
| 6,488,629 B1 | * | 12/2002 | Sætre et al. | ................. 600/443 |
| 6,676,606 B2 | * | 1/2004 | Simpson et al. | ............ 600/458 |
| 6,790,181 B2 | * | 9/2004 | Cai et al. | ..................... 600/443 |
| 6,911,008 B2 | * | 6/2005 | Pelissier et al. | ............. 600/443 |
| 6,951,542 B2 | * | 10/2005 | Greppi et al. | ................ 600/443 |

* cited by examiner

*Primary Examiner*—Kanjibhai Patel
(74) *Attorney, Agent, or Firm*—McAndrews, Held & Malloy, Ltd.; Peter J. Vogel; Michael A. Dellapenna

(57) ABSTRACT

One or more embodiments of the present invention relates to a method and system for simultaneously generating spatially compounded and non-compounded images. In one embodiment, the present invention relates to a method for generating images using an ultrasound apparatus. This method comprises storing at least one frame and generating at least one image output from the at least one frame. The method further comprises displaying at least the generated image output.

19 Claims, 4 Drawing Sheets

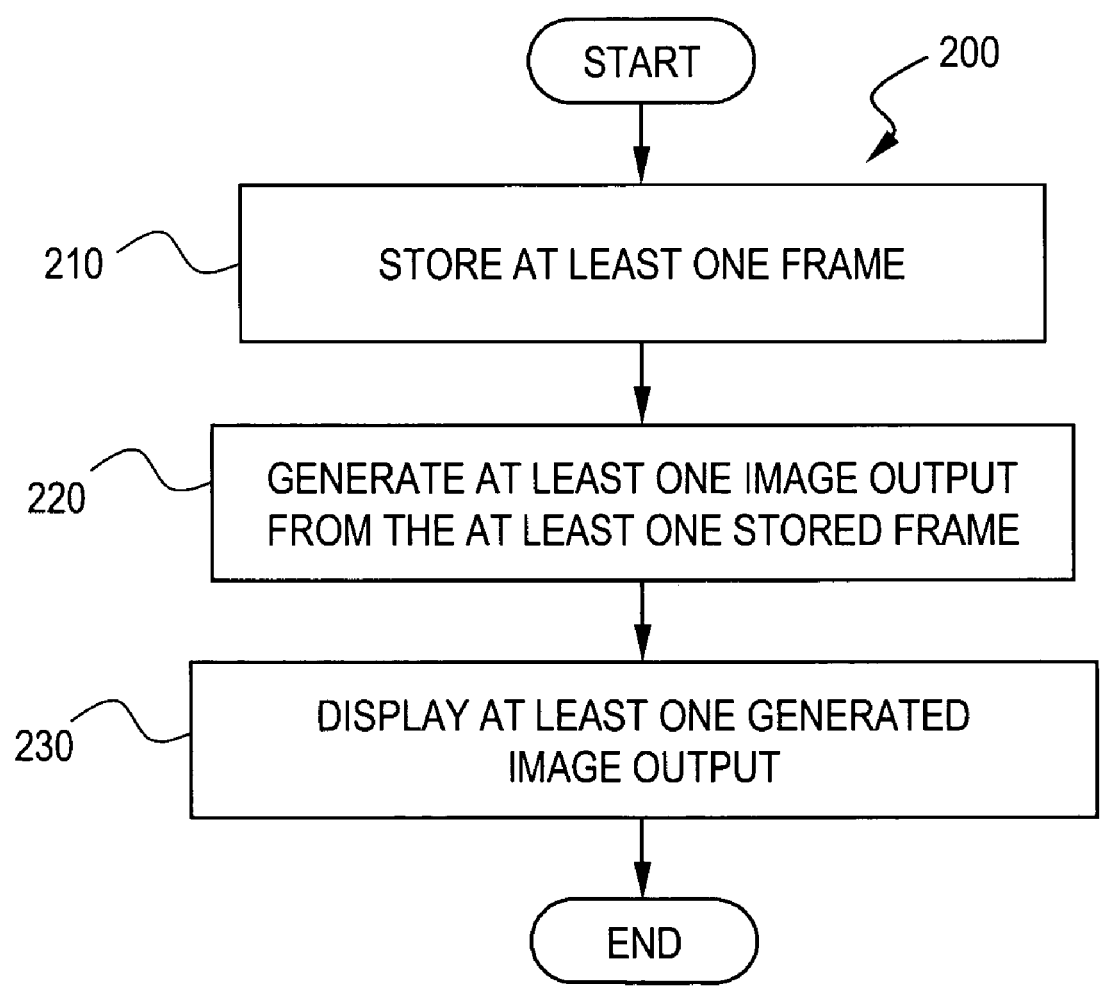

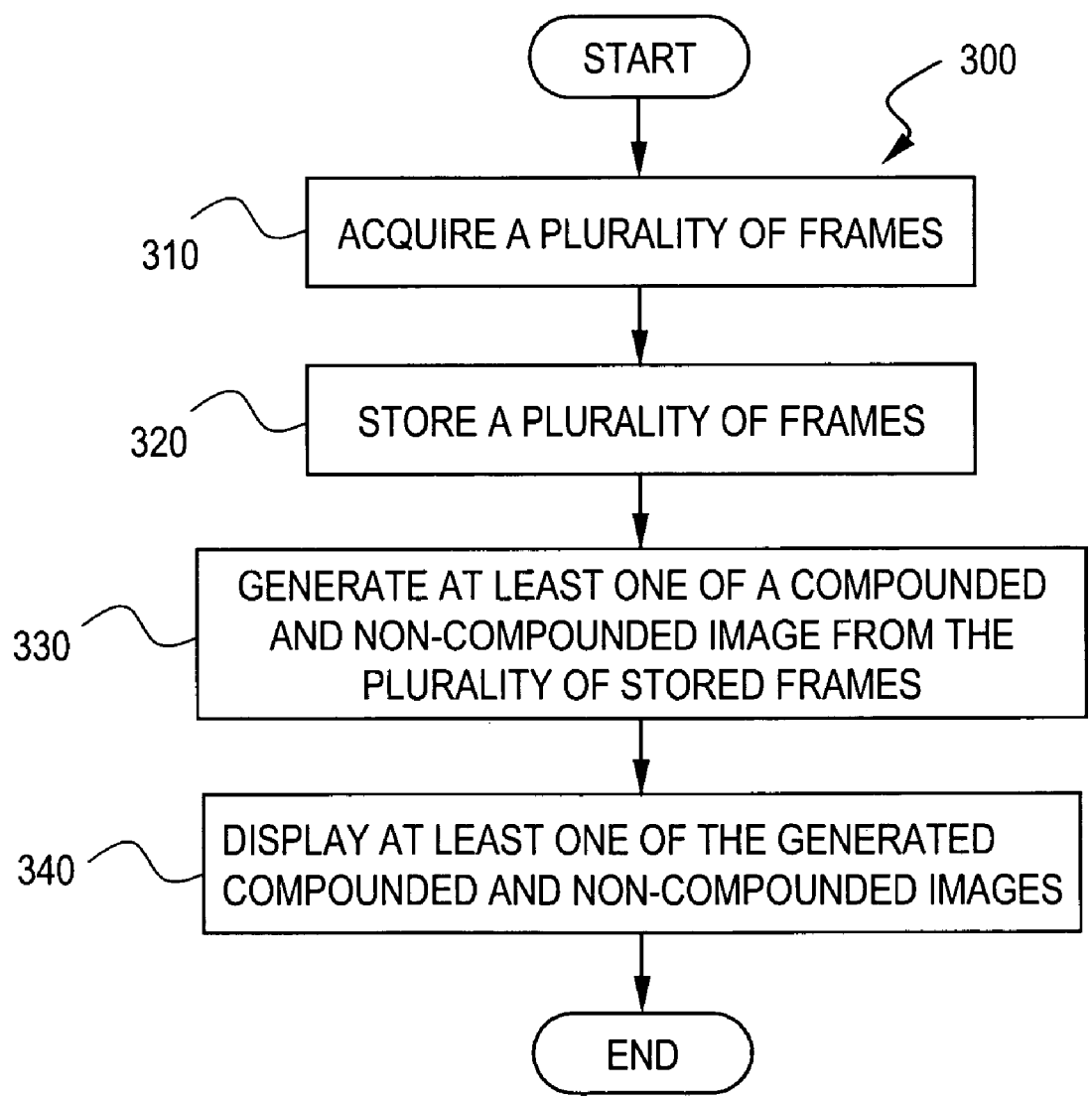

SIMULTANEOUS GENERATION OF SPATIALLY COMPOUNDED AND NON-COMPOUNDED IMAGES

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates generally to ultrasound. In particular, the present invention relates to the generation of spatial compounded and non-compounded images using an ultrasound device for example.

Known ultrasound systems, devices or apparatuses may include spatial or basic compounding. Spatial compounding combines two or more frames of images acquired at different geometries (using different angles on a probe for example) into a single composite image. Spatial compounding may improve in quality relative to conventional or non-compounded scanning by improving contrast resolution. However, it is contemplated, that with spatial or basic compounding, detailed information may be lost from the image due to the combination of image data. Such detailed information could be a very small structure or a shadow from a structure, for example.

Thus, a need exists for a method and system for simultaneously generating spatially compounded and non-compounded images.

BRIEF SUMMARY OF THE INVENTION

One or more embodiments of the present invention relates to a method and system for simultaneously generating spatially compounded and non-compounded images. In one embodiment, the present invention relates to a method for generating images using an ultrasound apparatus. This method comprises storing at least one frame and generating at least one image output from the at least one frame. The method further comprises displaying at least the generated image output.

One or more embodiments of the present invention relates to storing a plurality of frames, where at least two of the frames of the plurality of frames are acquired at different geometries or angles. Further, a less compounded image output may be generated using less than all of the plurality of frames. It is further contemplated that generating the at least one image may comprise generating compounded images, non-compounded images or both compounded or non-compounded images. Yet other embodiments of the present invention relates to displaying the generated images. It is contemplated that displaying at least one generated image comprises displaying at least one compounded image, non-compounded image (in real time for example) or compounded and non-compounded images simultaneously. It is further contemplated that displaying the at least one generated image output comprises displaying compounded and non-compounded images sequentially or generating at least one non-compounded image from a plurality of image frames.

Another embodiment of the present invention, relates to a method for generating images. This method comprises storing a plurality of frames and generating least one of a compounded and non-compounded image output from the plurality of frames. At least one of a generated compounded, non-compounded and both compound and non-compounded images may be displayed.

Still another embodiment of the present invention relates to a system for generating an image using an ultrasound device. This embodiment comprises a memory for storing at least one frame and at least one processing device adapted to process at least one of a compounded and non-compounded image. The present invention further comprises a display device adapted to display at least one compounded and non-compounded image. Embodiments of the present invention are contemplated wherein the processing device comprises at least a compound processing device and/or a non-compound processing device. A switch is contemplated coupled to the memory and at least one processing device. Further, one embodiment is contemplated having a storage device coupled to the memory, where the storage device is adapted to receive at least one recall and store command.

BRIEF DESCRIPTION OF SEVERAL VIEWS OF THE DRAWINGS

FIG. 3 illustrates a high level flow diagram depicting a method for generating spatially compounded and non-compounded images using an ultrasound machine or device (similar to that illustrated in FIG. 1) in accordance with embodiments of the present invention.

FIG. 4 illustrates another flow diagram depicting a method for generating spatially compounded and non-compounded images using an ultrasound machine or device (similar to that illustrated in FIG. 1) in accordance with embodiments of the present invention.

Figure 1:
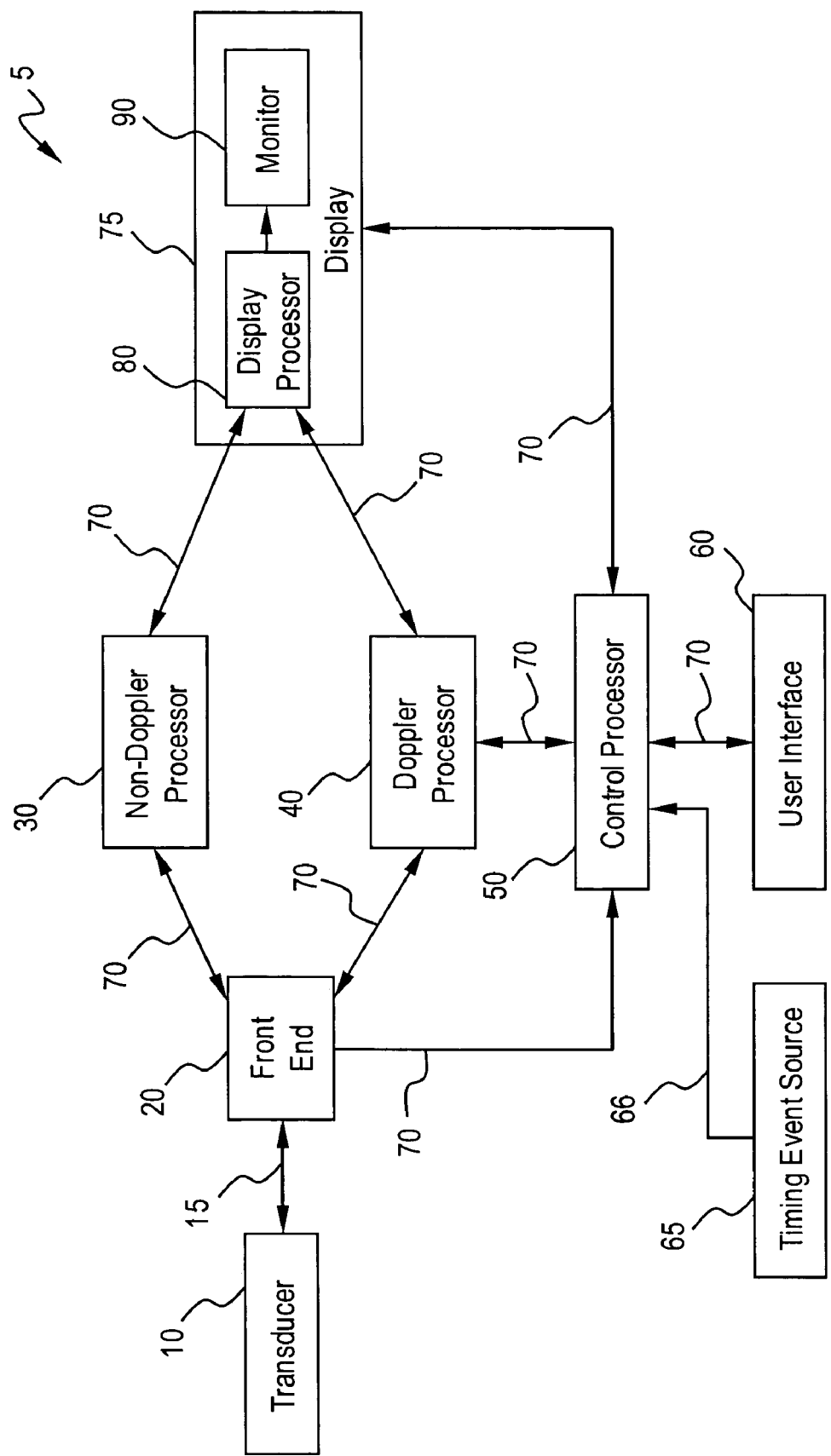
FIG. 1 illustrates a schematic block diagram of an ultrasound machine in accordance with certain embodiments of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

On embodiment of the present invention relates to a system and method for generating an image using an ultrasound apparatus, device or system. More specifically, one embodiment of the present invention enables the user to view spatially compounded image data, non-compounded image data or both at the same time, thereby enabling the user to determine if compounding has obscured any information in the image.

Additionally, data may be acquired with the compound process turned on (no non-compounded image currently being displayed) and then the image frozen. The compound processing may be turned off or deactivated and a non-compounded image may be displayed for comparison (i.e., the compounded and non-compounded images may be displayed sequentially, in any order). It is further contemplated that the non-compounded image may optionally be displayed side-by-side (i.e. simultaneously) with the original compounded image.

FIG. 1 illustrates a schematic block diagram of an embodiment of an ultrasound machine or device, generally designated 5, in accordance with certain embodiments of the present invention. A transducer 10 is used to transmit ultrasound waves into a subject by converting electrical analog signals to ultrasonic energy and to receive ultrasound waves backscattered from the subject by converting ultrasonic energy to analog electrical signals. Front-end 20, comprising a receiver, transmitter, and beamformer for example, may be used to create transmitted waveforms, beam patterns, receiver filtering techniques and demodulation schemes used for the various imaging modes. Front-end 20 performs the functions by converting digital data to analog data and vice versa. Front-end 20 interfaces at an analog interface 15 to transducer 10 and interfaces over a digital bus 70 to a non-Doppler processor 30 and a Doppler processor 40 and a control processor 50. Digital bus 70 may comprise several digital sub-buses, each sub-bus having its own unique configuration and providing digital data interfaces to various parts of the ultrasound machine 5.

In one embodiment, the ultrasound machine 5 may include a Non-Doppler processor 30 comprising amplitude detection functions and data compression functions used for imaging modes such as B-mode, B M-mode, and harmonic imaging. Doppler processor 40 comprises clutter filtering functions and movement parameter estimation functions used for imaging modes such as tissue velocity imaging (TVI), strain rate imaging (SRI), and color M-mode. The two processors, 30 and 40, accept digital signal data from the front-end 20, process the digital signal data into estimated parameter values, and pass the estimated parameter values to processor 50 and a display 75 over digital bus 70. The estimated parameter values may be created using the received signals in frequency bands centered at the fundamental, harmonics, or sub-harmonics of the transmitted signals in a manner known to those skilled in the art.

Display 75 comprises scan-conversion functions, color mapping functions, and tissue/flow arbitration functions, performed by a display processor 80 which accepts digital parameter values from processors 30, 40, and 50, processes, maps, and formats the digital data for display, converts the digital display data to analog display signals, and passes the analog display signals to a monitor 90. Monitor 90 accepts the analog display signals from display processor 80 and displays the resultant image to the operator on monitor 90.

A user interface 60 allows user commands to be input by the operator to the ultrasound machine 5 through control processor 50. User interface 60 comprises a keyboard, mouse, switches, knobs, buttons, track ball, and on screen menus.

A timing event source 65 is used to generate a cardiac timing event signal 66 that represents the cardiac waveform of the subject. The timing event signal 66 is input to ultrasound machine 5 through control processor 50.

Control processor 50 is the main, central processor of the ultrasound machine 5 and interfaces to various other parts of the ultrasound machine 5 through digital bus 70. Control processor 50 executes the various data algorithms and functions for the various imaging and diagnostic modes. Digital data and commands may be transmitted and received between control processor 50 and other various parts of the ultrasound machine 5. As an alternative, the functions performed by control processor 50 may be performed by multiple processors, or may be integrated into processors 30, 40, or 80, or any combination thereof. As a further alternative, the functions of processors 30, 40, 50, and 80 may be integrated into a single PC backend.

Figure 2:
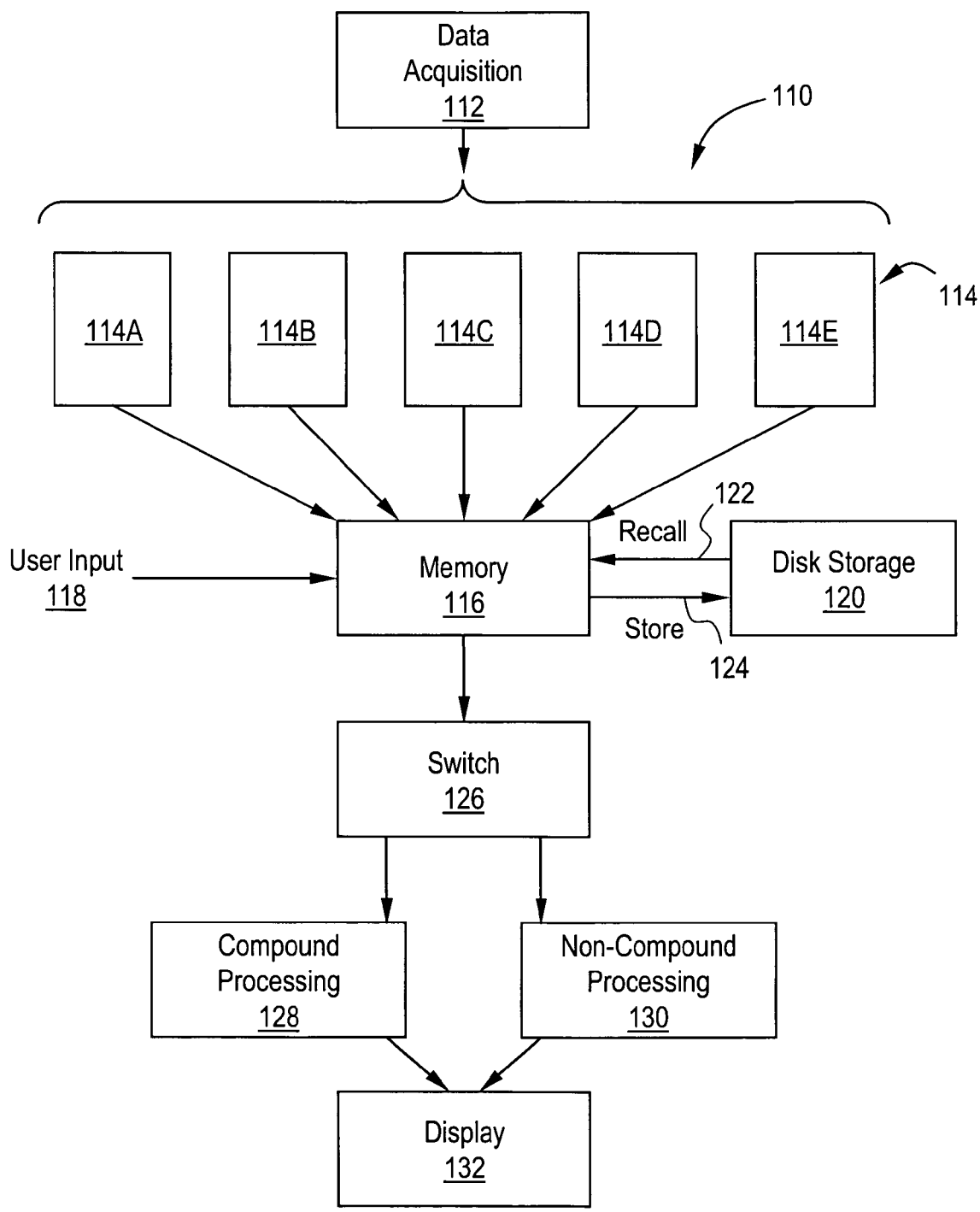
FIG. 2 illustrates a high level block diagram of a system for generating spatially compounded and non-compounded images in accordance with certain embodiments of the present invention.

FIG. 2 depicts a high level block diagram of one embodiment of the present invention generally designated 110. It is contemplated that, in at least one embodiment, the present invention may be used with an ultrasound system, device or apparatus similar to that disclosed in FIG. 1. Data is acquired, generally designated 112, using a scanner, probe, transducer or any other suitable data acquisition device, forming one or more images 114. In the illustrated embodiment five images, designated 114A, 114B, 114C, 114D and 114E are formed although a different number of frames are contemplated. It is also contemplated that the images may have the same or different geometries (i.e., the images are acquired at one or more different angles). The data images are stored in memory device 116. In at least one embodiment, the memory device 116 is adapted to receive user input 118.

In one embodiment, the invention comprises a storage device 120 adapted to store at least one or more images 114A through 114E. FIG. 2 illustrates a disk storage device, although other storage devices are contemplated. In one embodiment, the storage device 120 is adapted to receive at least one or more recall and store signals or commands 122 and 124 respectively. That is, one or more images may be stored using a store command 124 and recalled by the memory device 116 using a recall command 122.

A switch 126 is illustrated coupled to at least memory device 116. Switch 126 enables a user to select between compound processing, non-compound processing, or both. In one embodiment, the switch 126 is shown coupled to compound and non-compound processing devices 128 and 130. These processing devices 128 and 130, are adapted to process one or more images, forming spatially compounded image data, non-compounded image data or both. FIG. 2 further illustrates that the compound and non-compounded processing devices 128 and 130 are coupled to display 132.

In at least one embodiment of the present invention the non-compound processing device 132 may comprise a pass through, combinations of input frames using an algorithm, and compound images using fewer input frames. The non-compound processing device 132 comprising a pass through may be adapted to pass through at least one of the frames of data, similar to a straight steered frame in linear probe compounding. Such pass through may be combined with temporal interpolation to improve the apparent frame rate. The non-compound processing device 132 comprising a combination of each import frame using non-compounding algorithm. This may comprise, for example, displaying any given point in the output image as a value of the most recent frame contained in a geometric location. It is contemplated that the output image totally or partially updates with each incoming frame. The non-compound processing device 132 comprising compounding images using fewer input frames of data to generate the compound image. It is contemplated that, in this case, the output image is actually a less compounded image rather than a non-compound image.

It is further contemplated that combining the elements of at least one embodiment of the present invention 110 with the advanced storage capabilities of the scanner, a non-compounded image may be returned once a compounded image or series of images has been stored and recalled. This may be achieved by obtaining individual frames 114 acquired at different angles and stored in the memory 116. The frames 114 in the memory 116 may then be read and compounded for display. Likewise, the information in the memory 116 may be read and displayed in such a way that presents one or more frames 114 at different angles without compounding. Furthermore, the information may be read and simultaneously displayed with and without compounding. It should be appreciate that, in at least one embodiment, when a compounded image is stored, the contents of the memory 116 are stored (i.e., the compounded image is not stored). The frames are compounded, not compounded or both on recall, based on the user's choice.

It is contemplated that one or more embodiments of the present invention may include one or more of the following advantages. The user may have more confidence in their diagnosis by selecting to view either compounded and non-compounded images at the same time or viewing a non-compounded image generated using a compounded image after acquisition. One embodiment of the present invention may enable the user be more productive in making a diagnosis by enabling the user to view the compounded and non-compounded images at the same time. FIG. 3 illustrates a high level flow diagram depicting a method, generally designated 200, for generating spatially compounded and non-compounded images using an ultrasound machine or device (similar to that illustrated in FIG. 1) in accordance with embodiments of the present invention. In at least one embodiment, method 200 comprises Step 210 storing at least one frame. In at least one embodiment, a plurality of frames are stored.

Method 200 further comprises Step 220, generating at least one image output from the at least one stored frame. In accordance with embodiments of the present invention, generating the at least one image output comprises generating at least one compounded image, a non-compounded image or both compound and non-compound images. It is also contemplated that at least the compounded image output is generated from less than all of the plurality of frames. It is further contemplated that generating the at least one image output comprise generating at least one non-compounded image from a plurality of image frames.

Step 230 comprises displaying at least the generated image output. In at least one embodiment, displaying the generated output comprises displaying at least one compounded image, at least one non-compounded image or displaying compounded and non-compounded images simultaneously or sequentially. In at least one embodiment, at least the non-compounded image is generated in real time.

FIG. 4 illustrates another flow diagram depicting a method, generally designated 300, for generating spatially compounded and non-compounded images using an ultrasound machine or device (similar to that illustrated in FIG. 1) in accordance with embodiments of the present invention. In at least one embodiment, method 300 comprises Step 310, acquiring at least one frame. In at least one embodiment, a plurality of frames are acquired, wherein two or more frames are acquired from different geometries.

Step 320 comprises storing a plurality of frames. Method 300 further comprises Step 330, generating at least one of a compounded and non-compounded image output from the plurality of stored frames. In accordance with one or more embodiments, generating the at least one compounded and non-compounded image further comprise comprises generating compounded images, non-compounded images, or both compounded and non-compounded images. It is also contemplated that at least the compounded image may be generated from less than all of the plurality of frames. It is further contemplated that generating at least the one non-compounded image may be generated from a plurality of image frames.

Step 340 comprises displaying at least one of the generated compounded and non-compounded images. In at least one embodiment, displaying at least one of the generated compounded and non-compounded images comprises displaying at least one compounded image, at least one non-compounded image or displaying compounded and non-compounded images simultaneously or sequentially. In at least one embodiment, at least the non-compounded image may be generated in real time.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for generating images using an ultrasound device, the method comprising:
storing a plurality of frames;
generating at least one image output from said plurality of frames, wherein said at least one image output comprises a spatially compounded image and a non-compounded image; and
displaying said at least one image output.

2. The method of claim 1, wherein at least two frames of said plurality of frames are acquired at different geometries.

3. The method of claim 1, wherein a less compounded image output is generated from less than all of said plurality of frames.

4. The method of claim 1, wherein at least one of said spatially compounded and non-compounded images is generated in real time.

5. The method of claim 1, further including storing at least one of said spatially compounded and non-compounded images.

6. The method of claim 1, further including recalling at least one of said spatially compounded and non-compounded images.

7. A method for generating images using an ultrasound device, the method comprising:
acquiring a plurality of frames;
generating an image output, wherein said image output comprises a spatially compounded image and a non-compounded image from said plurality of frames; and
displaying said image output.

8. A system for generating an image using an ultrasound device, the system comprising:
a memory adapted to store a plurality of frames;
at least one processing device adapted to generate at least one image output from said plurality of frames, wherein said at least one image output comprises a spatially compounded image and a non-compounded image; and
a display device adapted to display said at least one image output.

9. The system of claim 8, wherein said at least one processing device comprises at least a compound processing device.

10. The system of claim 8, wherein said at least one processing device comprises at least a non-compound processing device.

11. The system of claim 8, further comprising a switch coupled to said memory and said at least one processing device.

12. The system of claim 8 further comprising a storage device coupled to said memory, wherein said storage device is adapted to receive at least one of a recall command and a store command.

13. The system of claim 8, wherein said memory may accept input from a user.

14. The method of claim 7, wherein at least two frames of said plurality of frames are acquired at different geometries.

15. The method of claim 7, wherein a less compounded image output is generated from less than all of said plurality of frames.

16. The method of claim 7, wherein at least one of said spatially compounded and non-compounded images is generated in real time.

17. The method of claim 7, further including storing at least one of said spatially compounded and non-compounded images.

18. The method of claim 7, further including recalling at least one of said spatially compounded and non-compounded images.

19. A computer-readable storage medium including a set of instructions for execution on a computer, the set of instructions including:
   an acquisition routine configured to acquire a plurality of frames;
   a processing routine configured to generate an image output comprising a spatially compounded image and a non-compounded image from said plurality of frames; and
   a display routine adapted to display said image output.

* * * * *